United States Patent
Dube et al.

(10) Patent No.: US 8,805,983 B2
(45) Date of Patent: Aug. 12, 2014

(54) LOCAL EXTERNALLY ACCESSIBLE MANAGED VIRTUAL NETWORK INTERFACE CONTROLLER

(75) Inventors: Shawn Joel Dube, Austin, TX (US); Timothy M. Lambert, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 389 days.

(21) Appl. No.: 12/581,280

(22) Filed: Oct. 19, 2009

(65) Prior Publication Data

US 2011/0093575 A1     Apr. 21, 2011

(51) Int. Cl.
   *G06F 15/16*             (2006.01)
   *G06F 15/177*           (2006.01)
   *G06F 15/173*           (2006.01)
   *H04L 12/66*            (2006.01)
   *G06F 3/00*              (2006.01)

(52) U.S. Cl.
USPC ........... 709/223; 709/202; 709/203; 709/220; 709/219; 709/250; 370/463; 719/324

(58) Field of Classification Search
USPC .................. 709/221–226, 250; 711/103, 105
See application file for complete search history.

(56) References Cited

U.S. PATENT DOCUMENTS

| | | | |
|---|---|---|---|
| 6,801,949 B1 * | 10/2004 | Bruck et al. | 709/232 |
| 7,872,989 B1 * | 1/2011 | Tong et al. | 370/254 |
| 2004/0088377 A1 * | 5/2004 | Henriquez | 709/219 |
| 2004/0153708 A1 * | 8/2004 | Joshi et al. | 714/4 |
| 2004/0190454 A1 * | 9/2004 | Higasiyama | 370/238 |
| 2005/0163320 A1 * | 7/2005 | Brown et al. | 380/270 |
| 2006/0184536 A1 * | 8/2006 | Jreij et al. | 707/10 |
| 2008/0162955 A1 * | 7/2008 | Shimizu | 713/300 |
| 2008/0239957 A1 * | 10/2008 | Tokura et al. | 370/235 |
| 2008/0263407 A1 * | 10/2008 | Yamamoto | 714/44 |
| 2008/0288685 A1 * | 11/2008 | Dalton et al. | 710/106 |
| 2009/0055665 A1 * | 2/2009 | Maglione et al. | 713/320 |
| 2009/0177334 A1 * | 7/2009 | Artman et al. | 700/300 |
| 2009/0210601 A1 * | 8/2009 | Greenstein | 710/305 |
| 2009/0307689 A1 * | 12/2009 | Sudhakar | 718/1 |
| 2010/0031258 A1 * | 2/2010 | Takano et al. | 718/1 |
| 2010/0191936 A1 * | 7/2010 | Khatri et al. | 712/42 |
| 2010/0218014 A1 * | 8/2010 | Bozek et al. | 713/320 |

* cited by examiner

*Primary Examiner* — Ranodhi Serrao
*Assistant Examiner* — Farrukh Hussain
(74) *Attorney, Agent, or Firm* — Haynes and Boone, LLP

(57) ABSTRACT

An information handling system (IHS) includes a processing system operating as a controller. A network interface controller is coupled to the processing system and receives communications from a remote administrator via a management network. An external virtual device link is coupled to the processing system.

20 Claims, 4 Drawing Sheets

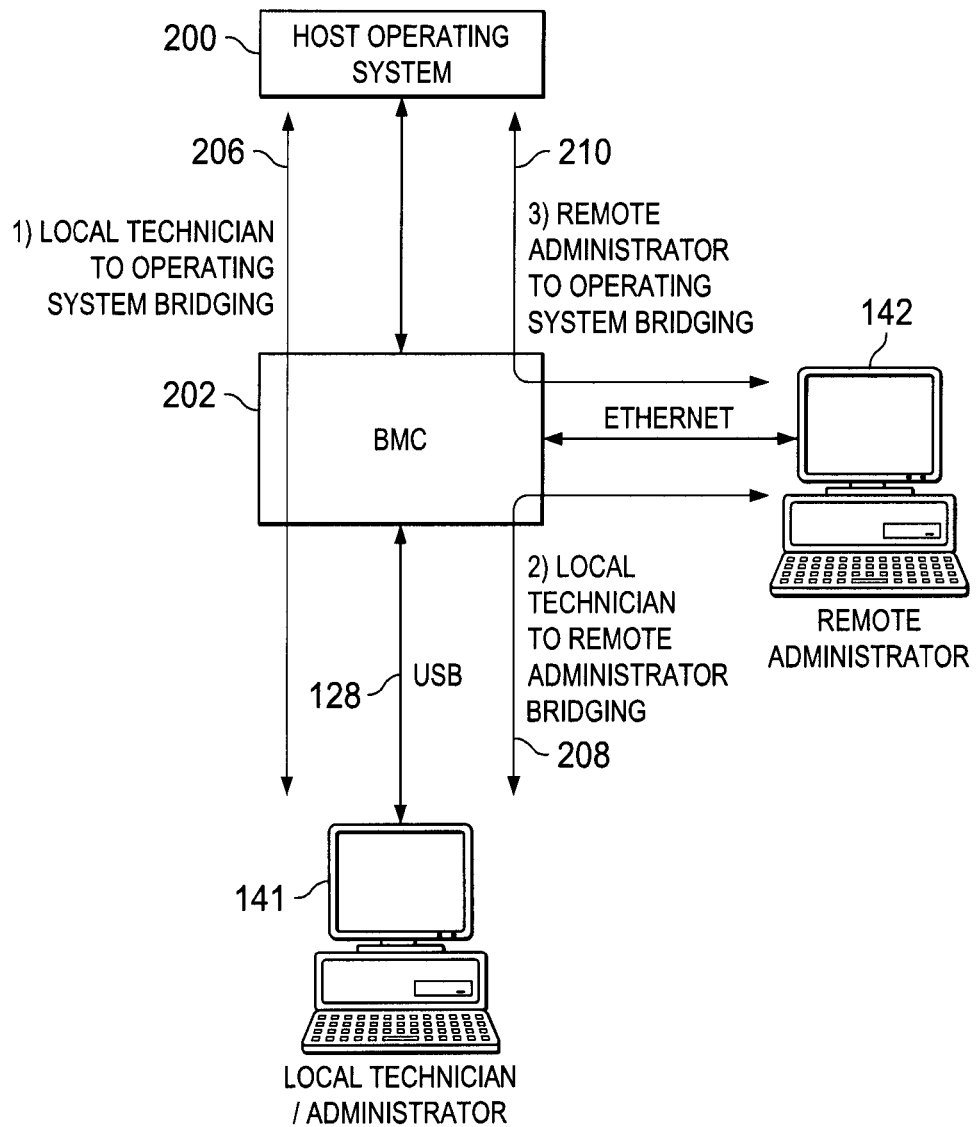

US 8,805,983 B2

LOCAL EXTERNALLY ACCESSIBLE MANAGED VIRTUAL NETWORK INTERFACE CONTROLLER

BACKGROUND

The present disclosure relates generally to information handling systems, and more particularly to an IHS virtual network interface controller system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

One type of IHS is a server IHS. The server IHS management Industry generally offers many tools and methods for remote server interactions by administrators/technicians. However, local server interactions, such as those at the server, but external to the chassis of the server and those interactions using a host operating system to a baseboard management controller (BMC), come with numerous compromise tradeoffs with less functionality. For example, local interaction with a server IHS is generally performed using a front control panel having very few interaction buttons, indicator lights and a small liquid-crystal display (LCD). Accordingly, local interaction with the server is slow and very limited in functionality. Therefore, it is desirable to improve local server interactions in easy, standards based, cost effective, easy to understand, extensible, scalable, fully secure ways that minimize research & development and create more commonality between local and remote interactions.

Accordingly, it is desirable to provide an improved IHS virtual network interface controller system.

SUMMARY

According to one embodiment, an information handling system (IHS) includes a processing system operating as a controller. A network interface controller is coupled to the processing system and receives communications from a remote administrator via a management network. An external virtual device link is coupled to the processing system.

BRIEF DESCRIPTION OF THE DRAWINGS

FIG. 4 illustrates a block diagram of an embodiment of local, external virtual NIC and bridging options.

DETAILED DESCRIPTION

For purposes of this disclosure, an IHS 100 includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS 100 may be a personal computer, a network storage device, or any other suitable device and may vary in size, shape, performance, functionality, and price. The IHS 100 may include random access memory (RAM), one or more processing resources such as a central processing unit (CPU) or hardware or software control logic, read only memory (ROM), and/or other types of nonvolatile memory. Additional components of the IHS 100 may include one or more disk drives, one or more network ports for communicating with external devices as well as various input and output (I/O) devices, such as a keyboard, a mouse, and a video display. The IHS 100 may also include one or more buses operable to transmit communications between the various hardware components.

Figure 1:
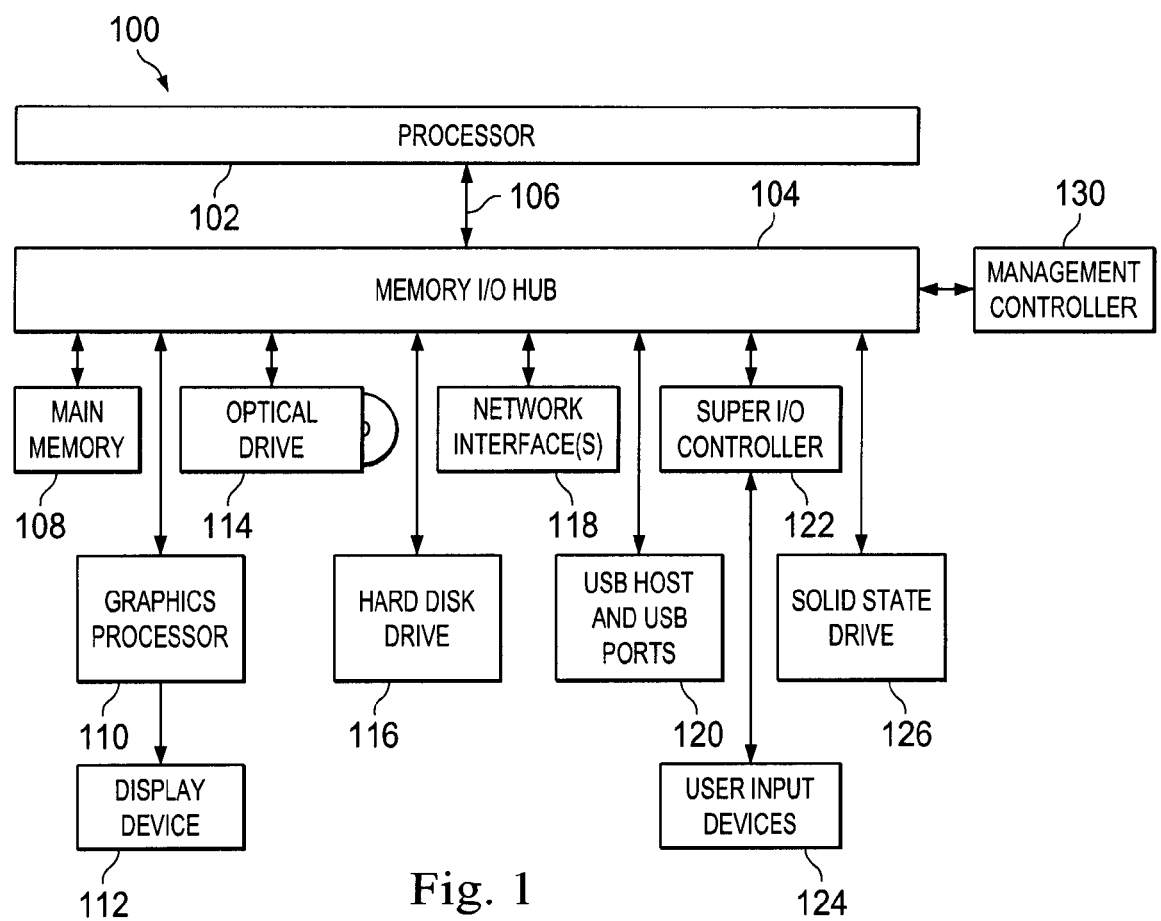
FIG. 1 illustrates an embodiment of an information handling system (IHS).

FIG. 1 is a block diagram of one IHS 100. The IHS 100 includes a processor 102 such as an Intel Pentium™ series processor or any other processor available. A memory I/O hub chipset 104 (comprising one or more integrated circuits) connects to processor 102 over a front-side bus 106. Memory I/O hub 104 provides the processor 102 with access to a variety of resources. Main memory 108 connects to memory I/O hub 104 over a memory or data bus. A graphics processor 110 also connects to memory I/O hub 104, allowing the graphics processor to communicate, e.g., with processor 102 and main memory 108. Graphics processor 110, in turn, provides display signals to a display device 112.

Other resources can also be coupled to the system through the memory I/O hub 104 using a data bus, including an optical drive 114 or other removable-media drive, one or more hard disk drives 116, one or more network interfaces 118, one or more Universal Serial Bus (USB) ports 120, and a super I/O controller 122 to provide access to user input devices 124, etc. The IHS 100 may also include a solid state drive (SSDs) 126 in place of, or in addition to main memory 108, the optical drive 114, and/or a hard disk drive 116. It is understood that any or all of the drive devices 114, 116, and 126 may be located locally with the IHS 100, located remotely from the IHS 100, and/or they may be virtual with respect to the IHS 100. In addition, a management controller 130 may be coupled to the memory I/O hub 104 to allow administrators, local or remote, to control operations of the IHS 100.

Not all IHSs 100 include each of the components shown in FIG. 1, and other components not shown may exist. Furthermore, some components shown as separate may exist in an integrated package or be integrated in a common integrated circuit with other components, for example, the processor 102 and the memory I/O hub 104 can be combined together. As can be appreciated, many systems are expandable, and include or can include a variety of components, including redundant or parallel resources.

Embedded systems on chips such as a baseboard management controller (BMC), a remote access controller (RAC), a service processor and, etc., are being developed with multiple internal USB client devices for device emulation to the host in the same fashion as traditional virtual keyboard video mouse (KVM), (e.g., may be referred to as graphical console redirection), and virtual media are performed. KVM is a Linux kernel virtualization infrastructure used for device virtualization. The present disclosure utilizes one of these links (e.g., directly or through a multiplexer (MUX) to increase flexibility) to an external device side USB connector. For example, this may be used on the front of a server IHS chassis. Being connected to an external IHS or appliance through a standard USB cable enables the BMC emulation to the IHS of various device types. One notable configuration is a USB network controller. Accordingly, this allows using a single, common cable for a local user to gain a plug-and-play network controller and virtual network interface controller (NIC) interface into the management subsystem in the same fashion as the full featured, traditional rear server remote management methodology.

The present disclosure relates to using a dynamic BMC emulated virtual NIC device whose connection does not go to the host but instead leaves the chassis of a server IHS for connecting to a client IHS's USB host controller. This system may be extended beyond just a virtual NIC to compound or mixed class composite devices. In an embodiment, the present disclosure provides for bridging externally facing and internally facing vNICs, thereby creating an external management subsystem controller vNIC solution. Accordingly, an embodiment of the present disclosure provides a dedicated device side USB port (e.g., different from the traditional host port) on a server IHS, which may be used as a high speed conduit for accessing the BMC subsystem.

Figure 2:
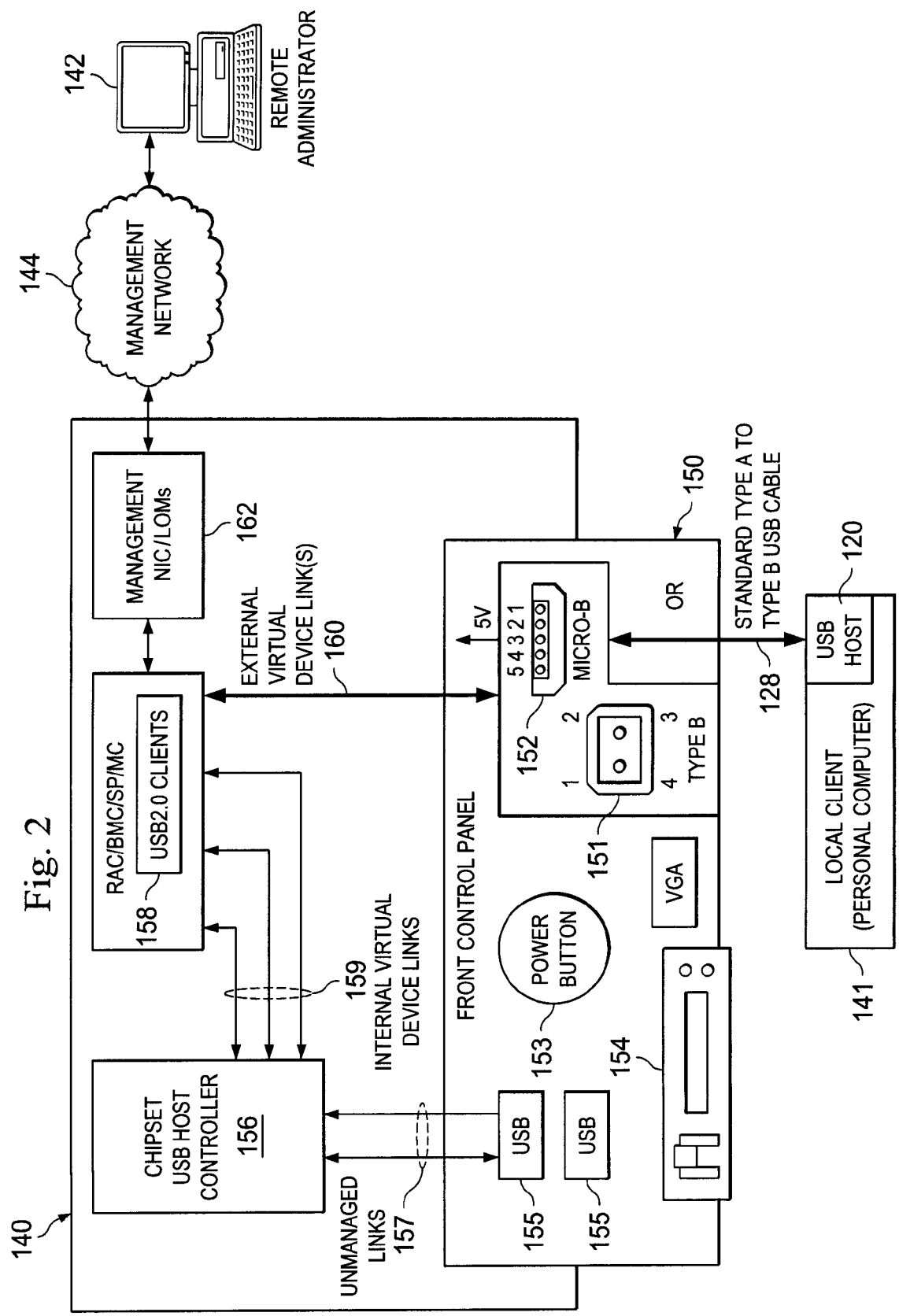
FIG. 2 illustrates a block diagram of an embodiment of a universal serial bus (USB)-based full featured server management local interaction system.

FIG. 2 illustrates a block diagram of an embodiment of a USB-based full featured server management local interaction system. This system includes a server IHS 140, a local client (e.g., a service technician/administrator) IHS 141 and a remote administrator IHS 142. Each of these IHSs 140, 141 and/or 142 may include components similar to that shown for the IHS 100 shown in FIG. 1. The remote administrator IHS 142 is generally located remotely from the server IHS 140 and is communicatively coupled to the server IHS 140 using a management network 144 such as an Ethernet network. The remote administrator IHS 142 may control operations and perform updates and maintenance of the server IHS 140 via the management network 144. The local client IHS 141 may be located locally with respect to the server IHS 140 and is communicatively coupled to the server IHS 140 using a USB cable 128 and USB communications.

In an embodiment, the USB cable 128 is a standard type A USB plug for plugging into a standard USB plug of the local client IHS 141 on one end and a standard type B USB plug or a standard Micro-B USB plug for plugging into corresponding standard plugs 151, 152 on a front control panel 150 on the server IHS 140. Other configurations of USB cable 128 may be used with the present disclosure to provide communications between the server IHS 140 and the local client IHS 141.

The control panel 150 includes other elements for allowing a local technician to perform operations such as updates and maintenance for the server IHS 140. However, these operations are limited, as should be understood. As shown, in addition to the plugs 151 and/or 152, the control panel 150 includes a power button 153, a display device plug (VGA), a display 154 having control buttons, a display screen (e.g., a liquid crystal display (LCD)) and display indicators (e.g., light emitting diodes (LEDs)). The control panel 150 may also include one or more USB ports that are communicatively coupled using unmanaged links 157 to a chipset USB host controller 156 of the server IHS 140. The chipset USB host controller 156 is communicatively coupled to one or more USB client (e.g., USB 2.0 clients) in a processing system 158, such as a RAC, a BMC, a service processor (SP) or a management controller (MC) using a plurality of internal virtual device links 159. The processing system 158 will be referred to as the BMC for simplicity. The BMC 158 is also communicatively coupled to the USB plugs 151, 152 using external virtual device links 160. Additionally, the BMC 158 is communicatively coupled to a management NIC 162.

The internal virtual device links 159 may relate to a virtual keyboard/mouse, virtual media, a virtual data storage device (e.g., a virtual flash drive), a virtual smart card and/or an internal virtual NIC. The external virtual device links 160 may relate to a virtual NIC, a virtual serial port, virtual storage, NIC bridging to pass through to operating system/hypervisor. In an embodiment, cable 5V input detection interrupts the RAC for on-demand device emulation. It is to be understood that an external local virtual NIC may replace a technician "crash cart" through virtual KVM and virtual media and provides a much richer feature set for local interaction (e.g., a larger display than traditional front panel LCD). It is contemplated that in an embodiment, the present disclosure provides for achieving identical functionality and look and feel between the remote administrator 142, the server host 140 and the local access device 141.

Figure 3:
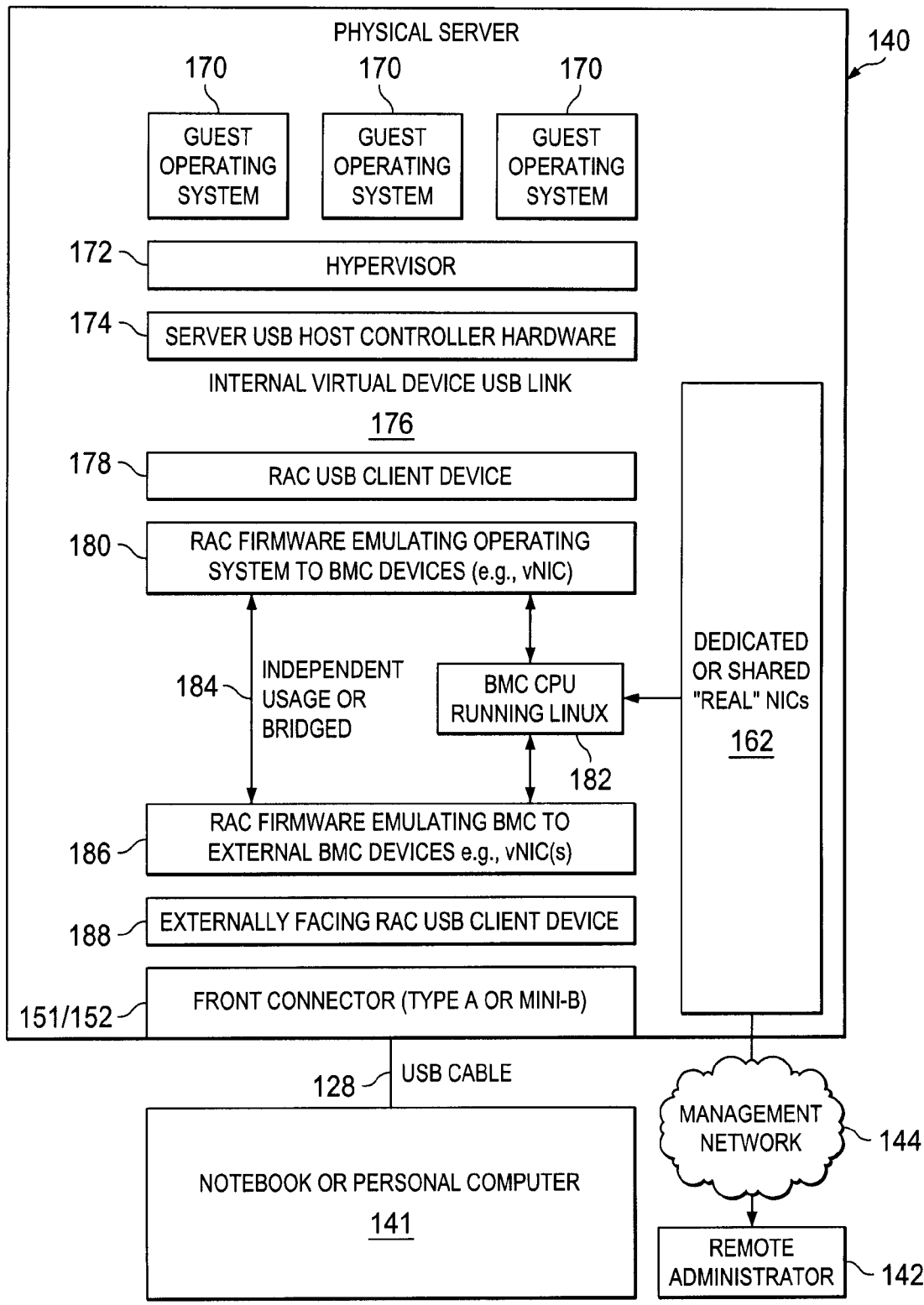
FIG. 3 illustrates a block diagram of an embodiment of a stackup of a network interface controller (NIC) bridging between an IHS and a remote access controller or optional pass through to guest operating systems.

FIG. 3 illustrates a block diagram of an embodiment of a physical server IHS 140 stackup of a NIC bridging between the local IHS 141 and the RAC or optional pass through to one or more guest operating systems 170. The guest operating systems 170 operate on a hypervisor 172. The hypervisor/virtual machine monitor 172 is generally an IHS software/hardware platform virtualization system that allows a plurality of operating systems (e.g., operating systems 170) to run a host IHS concurrently. In the stack, below the hypervisor 172 is a server USB host controller hardware 174 that may be substantially similar to the chipset USB host controller 156. The server USB host controller hardware 174 communicatively couples to a RAC USB client device 178 via an internal virtual device USB link 176, which may be substantially similar to the internal virtual device links 159. The RAC USB client device 178 uses a RAC firmware 180 to emulate an operating system to BMC devices such as a virtual NIC. A firmware is generally a set of IHS operational instructions. In the stack below the RAC firmware 180 is RAC firmware 186 emulating a BMC to external BMC devices such as virtual NICs. Independent usage or bridging 184 is used between the firmware systems 180 and 186 and with a BMC processor 182. In an embodiment, the processor 182 is an embedded operating system and operates using a set of LINUX instructions. However, systems other than LINUX may be used for the processor 182. The BMC CPU 182 communicatively couples to the dedicated or shared real NICs 162 for communicating with the remote administrator 142 via the network 144. The firmware 186 communicatively couples to the front USB connectors 151, 152 via an externally facing RAC USB client device 188. Similar to that shown in FIG. 2, the local client 141 may connect to the server 140 using a USB cable 128 plugged into a connector plug 151, 152.

FIG. 4 illustrates a block diagram of an embodiment of local, external virtual NIC and bridging options. A host operating system 200 communicatively couples with a BMC 202. The BMC 202 communicatively couples with the local administrator 141 and the remote administrator 142. Accordingly, the local administrator 141 may bridge to the host operating system 200 as shown as 206. Similarly, the local administrator 141 may bridge to the remote administrator 142 as shown as 208. Additionally, the remote administrator 142 may bridge to the host operating system 200 as shown as 210.

In an embodiment, all of the information/control consumers and providers are enabled to the same interfaces, features and etc.

In an embodiment, the present disclosure provides a RAC system including a user configurable or dynamic detection of a local USB host, such as by detecting a communication cable presence that is detected using a client supplied +5V, where the RAC emulates a USB communications class device, such as a Microsoft RNDIS network class device, that is configurable and settable to a static internet protocol (IP) address or starts a dynamic host configuration protocol (DHCP) server that hands out one or more configurable or default addresses. Upon detection of the +5V being removed, an embodiment provides that the RAC terminates the DHCP server and RNDIS network driver option to bridge an operating system to the BMC NIC (e.g., having a dynamic number of IP addresses) to the BMC to external NIC for allowing an external client to access the full RAC feature set or for accessing the host and virtual devices. An embodiment of a client-side device observes a USB NIC attached and sets the network to the appropriate static IP or enabled DHCP and receives an address. Full remote or local server management features, such as WEB GUI, TELNET, remote racadm, SSH, IPMI, Serial over LAN, Virtual KVM and Virtual Media, are functional in this system.

Accordingly, it is contemplated that an IHS's management controller (e.g., a service processor) emulates one or more virtual USB devices connected to a USB host controller outside of the server IHS chassis. The present disclosure provides an ability for a management subsystem to dynamically detect whether a USB device or USB host controller is connected to the external USB Port of the server IHS and configure its port appropriately to a USB device or USB Host controller with the appropriate driver/software stack. This is accomplished via detection of a VBUS (e.g., +5V) supplied by a USB host controller or if current is consumed by the external USB device. Upon detection of a USB device plugged into the external port (such as mass storage USB key like device), the management subsystem enumerates and uses the peripheral. That data or functionality is then used for its own usages or made available to remote users or to the server host operating environment. Upon detection of a USB host controller attached to the external port, the management controller emulates virtual devices to the external USB host controller, such as but not limited to NIC(s) and mass storage devices. Thus, the external IHS operating system enumerates management controller emulated virtual USB devices as if they are standard directly attached real devices. The externally facing USB link can be one or more physical links where devices can be emulated on separate busses or combined as a composite device on a single bus. Upon emulating a USB NIC to the external port, the management controller additionally emulates a point to point network, whose traffic flows through the USB NIC, as well as a DHCP server and other standard network services, thereby providing the same server management user experience to a local administrator that traditionally exists for only remote administrators. After the direct USB-based network with the management subsystem in the server is established, the management controller further may create network bridges between the local direct USB attached user and either remote administrators through the real management network or to the server host operating environment.

The present disclosure provides for common local/external server host and remote interactions that may be performed with no compromises in operational feature sets. Contemplated feature sets and security include, but are not limited to, WEB GUI, TELNET, SSH, Serial over LAN, vKVM and vmedia (if another USB client device is available). It is contemplated that with the present disclosure no embedded USB host is needed on the RAC, which saves Silicon and embedded firmware development for support of various physical devices. It is also contemplated that the present disclosure provides for service technician access to the server IHS without granting the service technician corporate network access. This may be desirable when the service technician is a third party entity. The server IHS, may be designed to be mutually exclusive for users who want the traditional local LCD and those who do not. In other words, the traditional LCD's may be optional. USB 2.0 may be used with the present disclosure, however, other communication systems are contemplated. USB 2.0 480 Mbps is a faster interface than 100 Mbps Ethernet and therefore, there is no performance degradation using the local administrator to interact with the server IHS as when compared to using the remote administrator. The local administrator system provides for using small, in-expensive front connectors and cables, thereby reducing implementation and development costs. Software for implementing the present disclosure uses common components, which further reduces development costs. Using development for improving remote features also directly benefits local interactions. In an embodiment, no client side applications are needed because identical local and remote interaction methods may be used (e.g., web-based vs client based and all necessary plugins may be served by the RAC). Using the systems of the present disclosure provides for concurrent local and remote access where local access looks like another remote user session to the server IHS. In an embodiment, the present disclosure provides for replacing the traditional local crash cart (e.g., video+USB) utilizing vKVM and does not affect local buttons, such as traditional blue/amber or other features. Generally with the present disclosure, no wireless or new protocols or infrastructures are needed over traditional systems. In the manufacturing mode, RAC debug serial can be configured to this port, thereby eliminating backdoor serial dongles (e.g., MUX UART). In an embodiment, a local administrator can concurrently service any number of server IHSs (e.g., a max of 128) simultaneously via separate USB port/hubs. In an embodiment, it may be user configurable to disable the external port and instead use the RAC USB device as a separate BMC to host the operating system channel.

In light of the present disclosure it should become apparent that this disclosure provides a unique solution to extending virtual devices outside the server IHS chassis and takes advantage of maximizing the interactivity of local users with little development effort and little platform hardware costs, without compromising security or legacy interaction methods. Additionally, the systems set forth in this disclosure provide for much innovation with local and remote server management models, features and use cases.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A server information handling system (IHS), comprising:
a server IHS chassis;
a processing system located in the server IHS chassis and operating as a management controller;

a management network interface controller (NIC) located in the server IHS chassis, coupled to the processing system, and configured to transmit communications via a network between a remote IHS and the processing system during a remote IHS session to provide a server management user experience to a remote administrator that is using the remote IHS;

a host controller located in the server IHS chassis and coupled to the processing system through an internal virtual device link; and a physical connector interface located on an external surface of the server IHS chassis, wherein the physical connector interface is directly coupled to the processing system through an external virtual device link, and wherein in response to a cabled connection of a local IHS to the physical connector interface, the processing system is configured to configure the connection to transmit communications with the local IHS over the external virtual device link during a local IHS session such that the local IHS session provides a server management user experience to a local administrator that is using the local IHS that is the same as the server management user experience that is provided during the remote IHS session to the remote administrator using the remote IHS.

2. The IHS of claim 1, wherein the external virtual device link includes a virtual NIC emulated by the processing system.

3. The IHS of claim 1, wherein the processing system is configured to communicatively bridge the remote IHS and the local IHS using the external virtual device link and the management NIC.

4. The IHS of claim 1, wherein the physical connector interface includes a universal serial bus (USB) physical connector interface.

5. The IHS of claim 1, wherein the processing system is configured to provide a dynamic host configuration protocol (DHCP) server in order to provide the local IHS with an address.

6. The IHS of claim 1, wherein the processing system is configured to communicatively bridge the host controller and the local IHS using the external virtual device link and the internal virtual device link.

7. The IHS of claim 1, wherein the processing system is configured to emulate the external virtual device link in response to detecting the connection of the local IHS to the physical connector interface.

8. A server information handling system (IHS), comprising:

a server IHS chassis;

a management controller located in the server IHS chassis;

a management network interface controller (NIC) located in the server IHS chassis and coupled to the management controller, wherein the management NIC is configured to connect to a network such that the management controller may transmit communications with a remote IHS during a remote IHS session to provide a server management user experience to a remote administrator that is using the remote IHS; and a virtual NIC emulated by the management controller and coupled to a physical connector interface that is located on an external surface of the server IHS chassis, wherein in response to the physical connector interface being connected to a local IHS using a cable, the management controller is configured to configure the connection to transmit communications with the local IHS during a local IHS session such that the local IHS session provides a server management user experience to a local administrator that is using the local IHS that is the same as the server management user experience that is provided during the remote IHS session to the remote administrator using the remote IHS.

9. The IHS of claim 8, wherein a direct connection is provided between the management controller and the physical connector interface.

10. The IHS of claim 8, further comprising:

a multiplexer coupled between the management controller and the physical connector interface.

11. The IHS of claim 8, wherein the physical connector interface includes a universal serial bus (USB) physical connector interface.

12. The IHS of claim 8, wherein the management controller is configured to communicatively bridge the local IHS with a remote IHS using the virtual NIC and the management NIC.

13. The IHS of claim 8, wherein the management controller is configured to emulate the virtual NIC in response to detecting that the local IHS has been connected to the physical connector interface.

14. The IHS of claim 8, further providing:

a host controller located in the server IHS and coupled to the management controller through a plurality of internal virtual device links, where the management controller is configured to communicatively bridge the local IHS and the host controller using the virtual NIC and the plurality of interval virtual device links.

15. A method comprising:

providing a server Information Handling System (IHS) including a server IHS chassis that houses a management controller and includes a physical connector interface on an external surface of the server IHS chassis;

coupling a remote IHS to the management controller over a management network, using a management network interface controller (NIC) that is located in the server IHS chassis, such that the management controller may transmit communications over the network with a remote IHS during a remote IHS session to provide a server management user experience to a remote administrator that is using the remote IHS; and connecting a local IHS to the physical connector interface using a cable such that an external virtual device link that is emulated by the management controller couples the management controller to the local IHS and, in response to the connecting, configuring the connection using the management controller such that management controller may transmit communications with the local IHS during a local IHS session such that the local IHS session provides a server management user experience to a local administrator that is using the local IHS that is the same as the server management user experience that is provided during the remote IHS session to the remote administrator using the remote IHS.

16. The method of claim 15, wherein the external virtual device link is a direct connection between the physical connector interface and the management controller.

17. The method of claim 15, further comprising:

communicatively bridging the remote IHS and the local IHS using the management NIC and the external virtual device link.

18. The method of claim 15, further comprising:

emulating the external virtual device link as a virtual NIC using the management controller in response to detecting the connection of the local IHS to the physical connector interface.

19. The method of claim 15, further comprising:
communicatively bridging the host controller and the local IHS using the internal virtual device link and the external virtual device link.

20. The method of claim 15, further comprising:
providing a dynamic host configuration protocol (DHCP) server using the management controller; and
providing an address to the local IHS using the DHCP server.

\* \* \* \* \*